US012627065B2

(12) United States Patent
Schröter et al.

(10) Patent No.: US 12,627,065 B2
(45) Date of Patent: May 12, 2026

(54) APPARATUS, IN PARTICULAR MEASURING DEVICE HAVING AN ANTENNA, FOR ACQUIRING A CONSUMPTION QUANTITY

(71) Applicants: Diehl Metering Systems GmbH, Nuremberg (DE); Diehl Metering S.A.S, Saint Louis (FR)

(72) Inventors: Simon Schröter, Erlangen (DE); Michael Sigl, Tuchenbach (DE); Jean-Bruno Togni, Saint-Bernard (FR)

(73) Assignees: Diehl Metering Systems GmbH, Nuremberg (DE); Diehl Metering S.A.S., Saint Louis (FR)

( * ) Notice: Subject to any disclaimer, the term of this patent is extended or adjusted under 35 U.S.C. 154(b) by 89 days.

(21) Appl. No.: 18/632,360

(22) Filed: Apr. 11, 2024

(65) Prior Publication Data

US 2024/0380117 A1 Nov. 14, 2024

(30) Foreign Application Priority Data

May 12, 2023 (DE) ......................... 102023112588.5

(51) Int. Cl.

*H01Q 13/24* (2006.01)
*H01Q 1/24* (2006.01)
*H01Q 1/38* (2006.01)

(52) U.S. Cl.

CPC ............... *H01Q 13/24* (2013.01); *H01Q 1/24* (2013.01); *H01Q 1/38* (2013.01)

(58) Field of Classification Search

CPC . H01Q 13/24; H01Q 1/24; H01Q 1/38; G01F 15/14; G01F 15/063; G01D 11/245; G01D 4/002

See application file for complete search history.

(56) References Cited

U.S. PATENT DOCUMENTS 11,619,529 B2 4/2023 Pilegaard et al.
11,644,352 B2 5/2023 Pilegaard et al.
12,266,841 B2 * 4/2025 Pflüger .................. H01Q 13/06

FOREIGN PATENT DOCUMENTS

EP 3550272 B1 3/2021

* cited by examiner

*Primary Examiner* — Seung H Lee

(74) *Attorney, Agent, or Firm* — Laurence A. Greenberg; Werner H. Stemer; Ralph E. Locher

(57) ABSTRACT

An apparatus, in particular a measuring device, for acquiring a consumption quantity, includes a housing, a circuit board disposed inside the housing, a communication device, and an antenna disposed on the circuit board. The communication device is adapted to transmit data at a given carrier frequency between the apparatus and an external device via the antenna. A dielectric with changeable permittivity with respect to the carrier frequency is disposed inside the housing. The circuit board and/or a metallic or metal-containing shielding device is disposed between the dielectric and the antenna and/or a minimum distance of the antenna from the dielectric is at least 30% or at least 50% of a maximum diameter of the interior of the housing.

18 Claims, 4 Drawing Sheets

APPARATUS, IN PARTICULAR MEASURING DEVICE HAVING AN ANTENNA, FOR ACQUIRING A CONSUMPTION QUANTITY

CROSS-REFERENCE TO RELATED APPLICATION

This application claims the priority, under 35 U.S.C. § 119, of German Patent Application DE 10 2023 112 588.5, filed May 12, 2023; the prior application is herewith incorporated by reference in its entirety.

FIELD AND BACKGROUND OF THE INVENTION

The invention relates to an apparatus, in particular a measuring device for acquiring a consumption quantity, having a housing, a circuit board disposed inside the housing, a communication device, and an antenna disposed at or on the circuit board, wherein the communication device is adapted to transmit data at a given carrier frequency between the apparatus and an external device via the antenna, and a dielectric with changeable permittivity with respect to the carrier frequency is disposed inside the housing.

The electronics of measuring devices for acquiring a consumption quantity, for example of water, electricity and heat meters, must frequently be protected from environmental influences and in particular from moisture. One possible method for achieving that is to encapsulate the electronics or to close the housing by using potting compound. However, that makes maintenance of the measuring device more difficult.

European Patent EP 3 550 272 B1, corresponding to U.S. Pat. Nos. 11,619,529 and 11,644,352, for example, discloses the use of a drying agent for moisture protection in corresponding measuring devices, the drying agent being able to absorb moisture that penetrates the housing. As a result, it can be possible to dispense with encapsulation of the electronics or of the housing.

However, it has been recognized within the scope of tests that, although the use of drying agent in a measuring device is unproblematic for communication with the measuring device in the case of the use of relatively high carrier frequencies of, for example, 868 MHz in the UHF band, in the case of the use of lower carrier frequencies, for example at 169 MHz in the VHF band, the use of a drying agent in the housing can have the result that the communication range decreases over the operating time and/or that, after a certain operating time, a higher energy consumption of the communication device results.

SUMMARY OF THE INVENTION

It is accordingly an object of the invention to provide an apparatus, in particular a measuring device having an antenna, for acquiring a consumption quantity, that overcomes the hereinafore-mentioned disadvantages of the heretofore-known devices of this general type, which occur in particular when lower-frequency carrier frequencies are used for communication, when using a drying agent in an apparatus provided with a communication device.

With the foregoing and other objects in view there is provided, in accordance with the invention, an apparatus of the type mentioned at the beginning, wherein on the one hand the circuit board and/or a metallic and/or metal-containing shielding device is disposed between the dielectric and the antenna, and/or on the other hand the minimum distance of the antenna from the dielectric is at least 30% or at least 50% of the maximum diameter of the interior of the housing.

It has been recognized within the scope of the invention that the presence of a dielectric in the vicinity of the antenna used for communication can influence the properties of the antenna, for example the impedance and resonant frequency thereof. While the presence of a dielectric with constant or at least approximately constant permittivity in respect of the carrier frequency can be taken into consideration in the configuration of the communication device or of the antenna, so that an optimum transmission amplitude or efficiency can be achieved, this is not possible in the case where the permittivity of the dielectric changes significantly over time.

The permittivity is also referred to as the dielectric constant. In the case of drying agents, the permittivity can change considerably as a result of the absorption of water. In the dry state, conventional drying agents have a relative dielectric constant of between 3 and 10. Water has a relative dielectric constant of approximately 80. Saturation of conventional drying agents typically results in a water content of about 20%. Thus, the water absorption leads to an increase in the dielectric constant or permittivity by about 150% of the permittivity in the dry state. This generally leads to significant detuning of the resonant frequency of the antenna and thus, depending on the bandwidth of the antenna, frequently to a significantly lower range or efficiency.

If the apparatus is, for example, a smart meter consumption meter, the installation space available for the antenna is generally rather small. As a result, the maximum usable overall height of the antenna can be limited, for example, to 5 cm or even to 3 cm. Therefore, the usable antennae in the UHF and VHF band are electrically small antennae. At high carrier frequencies of, for example, 868 MHz, or in the UHF band, suitable antennae frequently still have a relatively large bandwidth, so that the influence of a change in permittivity of the dielectric on the range or efficiency is less here than at lower transmission frequencies, that is to say, for example, at the transmission frequency of 169 MHZ, or in the VHF band. Therefore, the mentioned problem is apparently also not taken into consideration in the prior art cited at the beginning.

While the described problem is particularly pronounced for drying agents, it can also be relevant for other materials, in particular for plastics materials, the permittivity of which can be changeable over the operating time of the apparatus as a result of, for example, heat, ageing, UV light or the like.

According to the invention, this problem is avoided or reduced in that the influence of the dielectric with the changeable permittivity on the properties of the antenna is minimized by shielding by the circuit board or the shielding device and/or as a result of sufficient spacing apart.

In addition to the described spacing apart and/or shielding of the antenna from the dielectric, the influence of the dielectric on the antenna properties can also be reduced by choosing a suitable antenna geometry. The antenna geometry is preferably chosen in such a way that an electric field strength in the region of the dielectric resulting from operation of the antenna is as low as possible. A suitable antenna geometry can be achieved, for example, by a computer-implemented simulation and optimization of the field distribution of the antenna.

An arrangement of the antenna on the circuit board can be understood as meaning that the antenna is formed by a conductive path structure that is present on the circuit board.

By contrast, an antenna disposed at the circuit board can be formed, for example, by a separate component which is mounted on the circuit board and contacted by the conductive tracks thereof.

An arrangement of the circuit board or of the shielding device between the antenna and the dielectric can be understood as meaning in particular that all the straight connecting lines which connect any desired point of the dielectric with any desired point of the antenna cross the circuit board and/or the shielding device.

The mentioned distances between the antenna and the dielectric can be achieved, for example, by placing the antenna and the dielectric at opposite edge regions of the circuit board. In particular, the distance between the antenna and the dielectric can thus be at least 30% or at least 50% of the maximum distance between edges of the circuit board.

If a measuring device is used as the apparatus, this can in particular acquire a consumption of water, gas, electricity and/or heat. In particular, the apparatus can be a smart meter.

The dielectric can be disposed directly on or at least close to the circuit board. For example, the dielectric can be held in a receptacle which is carried by the circuit board. Alternatively, it is also possible to arrange the dielectric spaced apart from the circuit board and to mount it, for example, on the housing.

Shielding via the circuit board is based on slightly different effects depending on whether the antenna is a monopole antenna or a dipole antenna. In the case of a monopole antenna, the electric field is built up between the point of the antenna that is spaced furthest apart from the circuit board and the circuit board, so that the strongest electric field results along the shortest connecting path between the end of the antenna that is remote from the circuit board and the circuit board. By placing the dielectric on the rear side of the circuit board, the circuit board thus acts as shielding with respect to this region of strongest field strength. If, on the other hand, a dipole antenna is used, then the circuit board does not itself directly form part of the antenna and can in particular act as a surface with neutral potential and thus achieve shielding.

As has already been explained above, the dielectric can in particular be a drying agent. By using a drying agent in the housing, it is possible in particular to avoid damage to the electronics of the apparatus as a result of moisture, without the need to encapsulate the electronics or the housing. The drying agent can be, for example, silica gel or a molecular sieve. As has already been explained in detail above, the permittivity of conventional drying agents changes significantly as the water absorption increases, so that the procedure according to the invention is particularly advantageous in the case of the use of a drying agent in the housing.

The dielectric can be configured in such a way that the permittivity of the dielectric in respect of the carrier frequency changes by at least 50% over a given operating time period of the apparatus, in particular as a result of ageing of the dielectric, and/or until the dielectric becomes saturated with water, in particular as a result of adsorption and/or chemical binding of water. The greater the expected changes in the permittivity, the more relevant the shielding or spacing apart of the antenna from the dielectric that is provided according to the invention.

In addition or alternatively to pure ageing and/or water absorption of the dielectric over the operating time period, a change in the permittivity can also occur as a result of heat and/or other chemical processes apart from water binding and/or as a result of UV light. The mentioned extent of the permittivity change can result, apart from for drying agents, for example also for plastics materials, for example for housing components and/or sealing materials.

The operating time period can be considered to be, for example, a time period until it becomes necessary to replace or maintain the apparatus, for example because an expected lifetime of an energy store of the apparatus and/or a period of validity of a calibration of a measuring device has been reached. Operating time periods of consumption meters are typically specified by the manufacturer or by relevant regulations.

Alternatively, the given operating time period can be considered to be, for example, a time period of one year or of two years or of five years or of ten years.

The dielectric can be disposed at a distance of at least 2 mm or at least 10 mm from edges of the circuit board. Local maxima of the field strength caused by the antenna typically result in the region of edges of a circuit board carrying an antenna, so that it is advantageous to space the dielectric apart from those edges. The spacing apart of the dielectric from edges of the circuit board is particularly relevant when the dielectric is disposed on the rear side of the circuit board remote from the antenna.

The antenna can be disposed on the circuit board between a first edge of the circuit board and a second edge of the circuit board opposite the first edge and closer to the first edge than to the second edge, wherein the dielectric is disposed closer to the second edge than to the first edge. The field strength at the respective edge caused by operation of the antenna reduces with the distance of the antenna from the edge. It is therefore particularly relevant to space the dielectric apart from the edge that is particularly close to the antenna.

A metallic or metal-containing component of the apparatus can be disposed between the dielectric and at least one edge of the circuit board. As a result, interaction with the electromagnetic field caused by operation of the antenna at the respective edge, and thus the influence of the properties of the dielectric on the antenna properties, can be markedly reduced. In particular, the metallic or metal-containing component can be disposed between the dielectric and the edge of the circuit board that is closest to the dielectric. In addition or alternatively, the dielectric can be disposed between two opposite edges of the circuit board, and a metallic or metal-containing component of the apparatus can be disposed between the dielectric and the respective edge.

The shielding device and/or the metallic or metal-containing component can be an electrical component of the apparatus which serves in particular for operation of the communication device or of the antenna and/or for the acquisition of measurement data. Such electrical components are frequently highly suitable for field shielding, so that, by using the mentioned arrangement, it can be achieved that an electrical component, in addition to its function already required in an electric circuit, is additionally used to reduce the influence of the dielectric on the antenna properties.

The shielding device and/or the metallic or metal-containing component can in particular be an energy store or storage device which serves to provide energy for the communication device and/or for at least one component which serves for the acquisition of measurement data. Energy stores can be relatively large components and frequently have metallic or metal-containing housings, which in particular can be at a defined potential, so that they are particularly suitable for the shielding of fields. For example, the energy store can be a cylindrical or approximately rectangular battery or a correspondingly shaped accumulator or capacitor.

The shielding device and/or the metallic or metal-containing component can be or include a wire mesh and/or a, in particular perforated, metal sheet and/or metallic threads and/or particles in a matrix material, and/or a metal-coated carrier material. The shielding device or the component can in particular be permeable to water, in particular when it encloses a drying agent used as the dielectric. In order to achieve permeability to water, a metal sheet that is used can have openings which have been introduced into the metal sheet by, for example, drilling, punching, etching, laser cutting or the like. Plastics material in particular can be used as the matrix material or coated material. A metallic coating can be applied, for example, by chemical vapor deposition or in the form of a metal foil.

The shielding device and/or the metallic or metal-containing component can each be in the form of either a rigid or a flexibly bendable component. The shielding device or the component can be in the form of, for example, a vessel for the drying agent, for example in the form of a flexible bag. Such a bag can in principle be produced in the conventional manner, wherein there can be used instead of a conventional plastics material, for example, a matrix material carrying metal particles or metal threads and/or a wire mesh as a casing or part of the casing of the bag. Such a casing can first be produced in the form of an endless tube and then cut and, after it has been filled with the drying agent, welded at its ends.

The dielectric, in particular the drying agent, can be in the form of a cohesive solid or also in the form of granules. Such granules can be held, for example, in a plastics container or a bag, but in addition or alternatively can also be held by the shielding device or the metallic or metal-containing component.

The dielectric can be enclosed completely by the shielding device and/or the metallic or metal-containing component and/or the circuit board, in particular in a cuboidal cage formed thereby. Alternatively, it is also possible for only some of the six side walls of such a cage to be present or to provide shielding, namely only at least one or at least two or at least three or at least four or at least five of the side walls. The remaining sides of the cube can be open to the housing interior or formed by materials which provide no or only a little shielding, for example by plastics material.

The dielectric can generally be disposed within a cuboidal holding volume, wherein the shielding device and/or the circuit board and/or the metallic or metal-containing component delimit the cuboidal holding volume on at least two or at least three or at least four or at least five or six of its side faces. Remaining side faces can each be open or formed by insulating material, for example plastics material. At least some of the side faces of the holding volume can be permeable to water, wherein a water-permeable side face can be formed, for example, by a wire mesh or by a perforated material, in particular by a perforated metal sheet.

The housing can have a recess, wherein a base of the recess formed by an inner surface of the housing is spaced further apart from the circuit board than is a rim of the recess formed by the inner surface of the housing, wherein the dielectric is held in the recess. Through the use of such a recess, the distance of the dielectric from the antenna or the circuit board can be increased further. In addition or alternatively, mounting of the dielectric, in particular in the case where granules are used as the dielectric or drying agent, can be achieved by using such a recess.

On the one hand the recess or on the other hand a further of the side faces of the holding volume can be closed in a closed position of a closing device by the closing device, wherein the closing device is movable, in particular pivotable, relative to the recess or the holding volume from the closed position into an open position in order to free an opening of the recess or of the holding volume, through which opening the dielectric can be introduced into and/or removed from the recess or the holding volume. The closing device can in particular form a removable or pivotable cover for the recess or the holding volume. The closing device can in particular be formed of metal or contain metal, so that in the closed position it can act in particular as additional shielding between the dielectric and the antenna, or regions in which strong fields caused by operation of the antenna occur.

In an advantageous embodiment of the apparatus, the dielectric can be disposed between the circuit board and a further circuit board, wherein on at least one of the sides of the dielectric a respective connecting device is connected on the one hand to a conducting surface of the circuit board and on the other hand to a conducting surface of the further circuit board. Preferably, at least two connecting device are used, the connecting device being disposed on opposite sides of the dielectric so that the connecting device and the circuit boards enclose the dielectric completely, in particular at least in a sectional plane.

The connecting device can in particular be in the form of a plug-type connection so that, by fitting the further circuit board to the circuit board by way of the at least one connecting device, the dielectric can be enclosed at least partially by the conducting surfaces of the circuit boards and the at least one conductive connecting device. As a result, good decoupling between the dielectric and the antenna can be achieved with a low outlay.

The circuit board and the further circuit board can be disposed substantially in parallel. For example, an angle between the circuit board and the further circuit board can deviate from a parallel course by less than 30° or less than 10°.

Other features which are considered as characteristic for the invention are set forth in the appended claims.

Although the invention is illustrated and described herein as embodied in an apparatus, in particular a measuring device having an antenna, for acquiring a consumption quantity, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
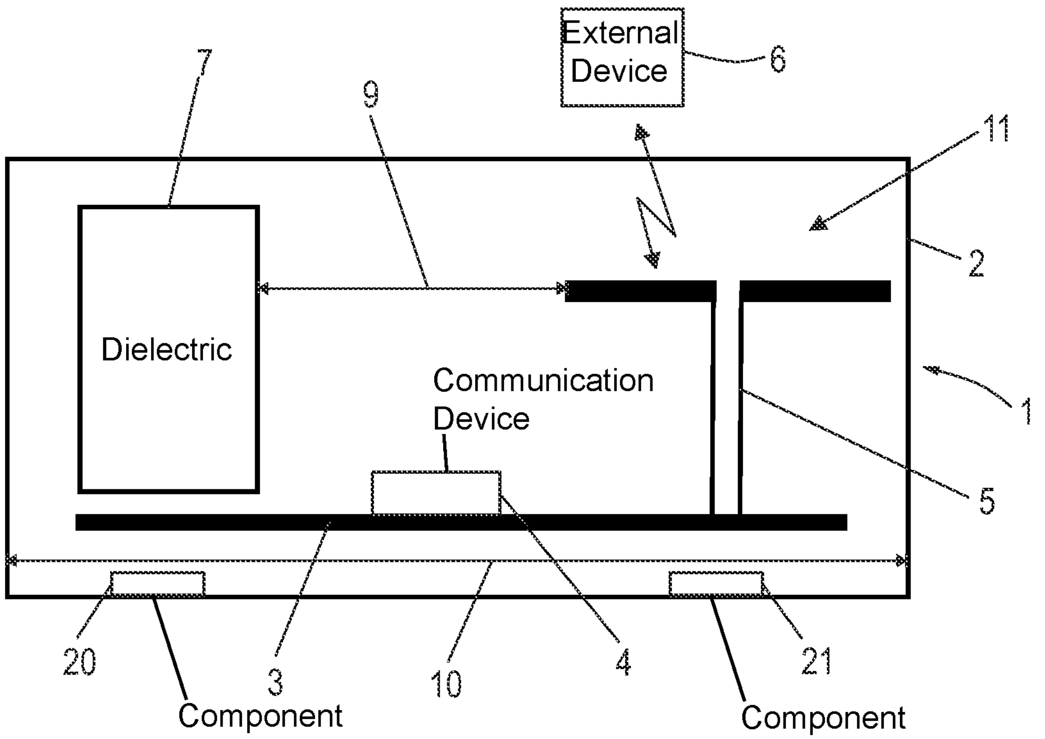
FIGS. 1-8 are diagrammatic, longitudinal-sectional views of different exemplary embodiments of the apparatus according to the invention, from which further advantages and details of the invention will become apparent.

Referring now to the figures of the drawings in detail and first, particularly, to FIG. 1 thereof, there is seen an apparatus 1, which in the example is a measuring device for acquiring a consumption quantity and which includes a housing 2, a circuit board 3 disposed inside the housing 2, a communication device 4, and an antenna 5 disposed on the circuit board 3. In the example, the communication device is adapted to transmit data at a given carrier frequency to an external device 6 via the antenna 5 and optionally also to receive data from the external device. For example, meter data can be transmitted to a read-out device or a central collection point.

The communication device 4 is additionally adapted to acquire meter data via components 20, 21, for example via ultrasonic transducers for acquiring a flow through a pipeline (not shown). A consumption determined on the basis of these meter data can be transmitted wirelessly to the external device 6 continuously or at specific times.

In order to protect the electronics disposed in the housing 2, that is to say in particular the communication device 4, the antenna 5 and/or the components 20, 21, from moisture, there is additionally disposed in the housing a drying agent, for example a silica gel, which forms a dielectric 7 which, due to water absorption, has a changeable permittivity. The use of the drying agent as such a dielectric 7 is used here only as a particularly relevant example. The further comments relating to the arrangement or shielding of the dielectric 7 in the various examples which are discussed can also be applied to other dielectrics with changeable permittivity.

The dielectric 7 can be disposed directly on the circuit board 3 or can be connected to the circuit board 3 via a holding device (not shown). Alternatively, it would be possible, for example, to mount the dielectric 7 on the housing 2.

As has already been explained in the general part of the description, if the dielectric 7 were to interact strongly with the electromagnetic field caused by the antenna 5 or if it were to be situated in the vicinity of the antenna 5, the changeable permittivity could also lead to a change in the properties of the antenna 5 itself, in particular in its resonant frequency, so that, as the absorption of water by the drying agent increases, increasing detuning of the antenna 5 and thus a smaller communication range or a higher energy requirement of the transmission operation would result.

In order to avoid or at least reduce this problem, the exemplary embodiment shown in FIG. 1 uses a particularly simple solution in which a distance 9 between the dielectric 7 and the antenna 5 is chosen to be as large as possible within the framework of the installation space restrictions given by the housing dimensions of the housing 2. The distance 9 should therefore be at least 30% of the maximum diameter 10 of the interior 11 of the housing 2. Preferably, even larger distances are used and/or, as will be explained with reference to the following figures, the circuit board 3 or an additional shielding device 8 can be used in order to further reduce the interaction between the dielectric 7 and the antenna 5.

FIGS. 2 to 8 show alternative embodiments of the apparatus 1, in which the circuit board 3 and/or a shielding device 8 are used to decouple the antenna 5 from the dielectric 7. In order to give greater prominence to the central features of these examples, the communication device 4 and the components 20, 21 are not explicitly shown in the further figures.

Figure 2:
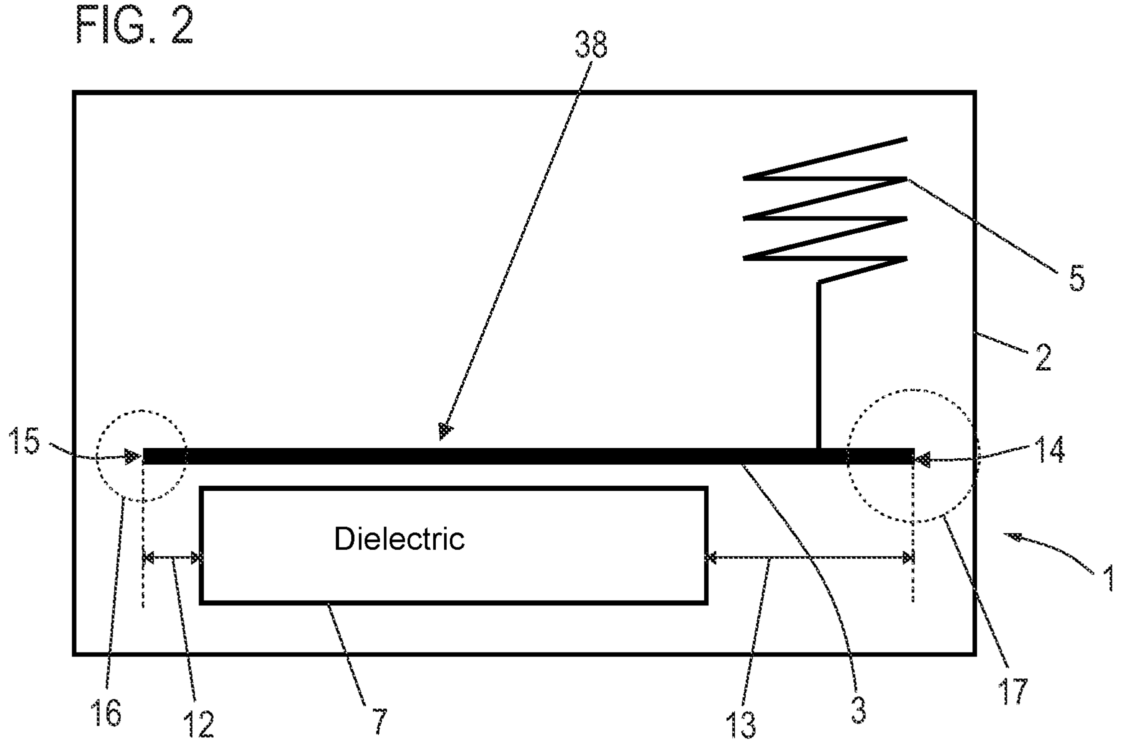

While in the example shown in FIG. 1 the dielectric 7 is disposed on the same side of the circuit board 3 which also carries the antenna 5, a different arrangement of the dielectric 7, namely an arrangement on the rear side of the circuit board 3 remote from the antenna 5, is used in the apparatus 1 according to FIG. 2. This has the result that the circuit board 3 is disposed between the dielectric 7 and the antenna 5, so that at least one conductive surface 38 of the circuit board 3, which in particular is at a defined potential, shields an alternating electromagnetic field radiated by the antenna 5 from the dielectric 7. As a result, an influence of the permittivity of the dielectric 7 on the properties of the antenna 5 is largely excluded or at least significantly reduced.

As is indicated schematically in FIG. 2 by circles 16, 17, local maxima of the field radiated by the antenna 5 typically occur in the region of edges 14, 15 of the circuit board 3. Therefore, the dielectric 7 is disposed and dimensioned in such a way that it is spaced sufficiently far apart, for example at least 5 mm apart, from the edges 14, 15.

Since in the exemplary embodiment shown in FIG. 2 the antenna 5 is disposed significantly closer to the edge 14 than to the edge 15, it is to be expected that higher field strengths also occur at the edge 14 than at the edge 15. It is therefore advantageous for a distance 13 of the dielectric 7 from the edge 14 to be chosen to be greater than a distance 12 from the edge 15.

A further difference between the embodiments shown in FIGS. 1 and 2 is that in FIG. 1 the antenna 5 is a dipole antenna, while in FIG. 2 and the following figures a monopole antenna is used by way of example. However, with regard to a spacing apart of the antenna 5 from the dielectric 7, or a shielding of the antenna 5 and the dielectric 7 from one another, monopole antennae and dipole antennae can be used substantially interchangeably. As has already been explained in the general part, although the antenna 5 interacts slightly differently with the potential of the conductive surface 38 of the circuit board 3 depending on whether it is a monopole antenna or a dipole antenna, a shielding action is nevertheless obtained in both cases.

Figure 3:
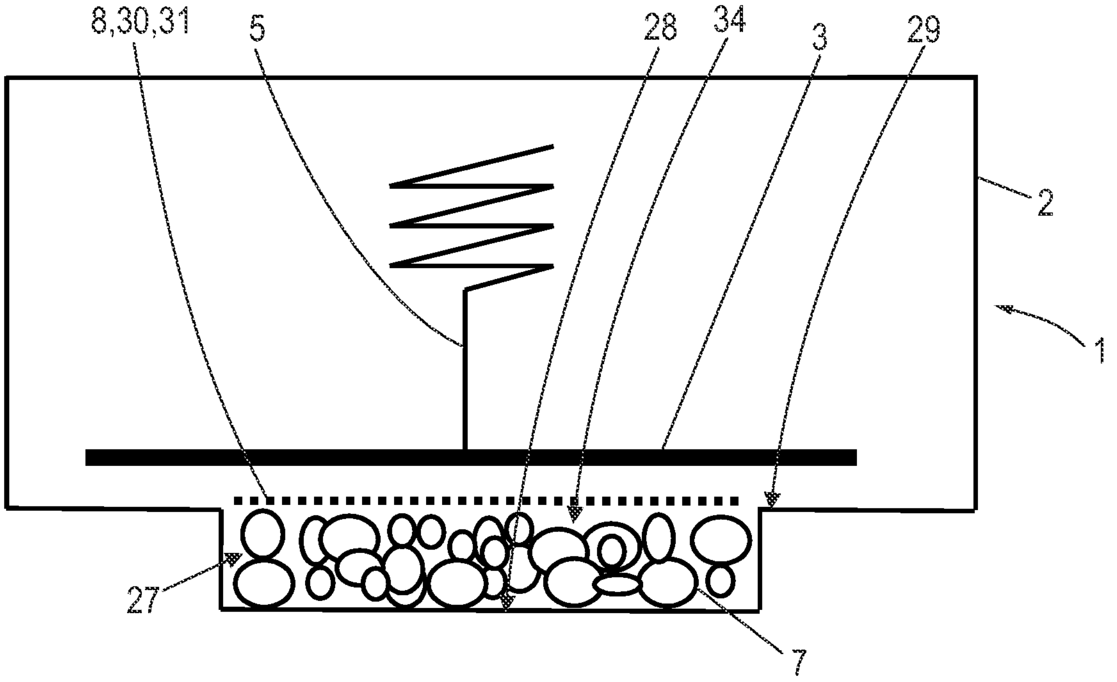

In the apparatus 1 shown in FIG. 3, the dielectric 7 is held in a recess 27 of the housing 2. A base 28 of the recess 27 in this case is spaced further apart from the circuit board 3 than is a rim 29 of the recess 27.

In a closed position 30 of a closing device 31 shown in FIG. 3, the recess 27 is closed by the closing device. The closing device 31 can be brought into an open position, for example, by being lifted from the housing 2, as a result of which it becomes possible to introduce or remove the dielectric 7. The closing device 31 can serve solely to hold the dielectric 7 inside the recess 27. In the exemplary embodiment shown, it is particularly advantageous to retain the dielectric 7 in this manner because the dielectric 7 in this case is used not in the form of a single solid but in the form of granules.

Preferably, however, the closing device 31 at the same time forms a metallic or metal-containing shielding device 8 which is disposed between the antenna 5 and the dielectric 7. This can be achieved, for example, by using a metal sheet as the closing device 31. In particular, a perforated metal sheet can be used, in order to facilitate the supply of moisture to the drying agent. Instead of a metal sheet, it would also be possible to use, for example, a wire mesh, a matrix material which includes metallic threads and/or particles, and/or a metal-coated carrier material.

The use of the granules as the dielectric 7 in FIG. 3 is purely by way of example, and the dielectric 7 can be used in the various exemplary embodiments either in the form of granules or in the form of a solid. In particular when granules are used, it is optionally possible to hold the dielectric 7 in a bag or a plurality of bags in order to facilitate handling thereof. As has already been discussed in the general part, such a bag can also serve for shielding, in particular as the shielding agent or as a metallic or metal-containing component 18, 19 which will be discussed hereinbelow.

Figure 4:
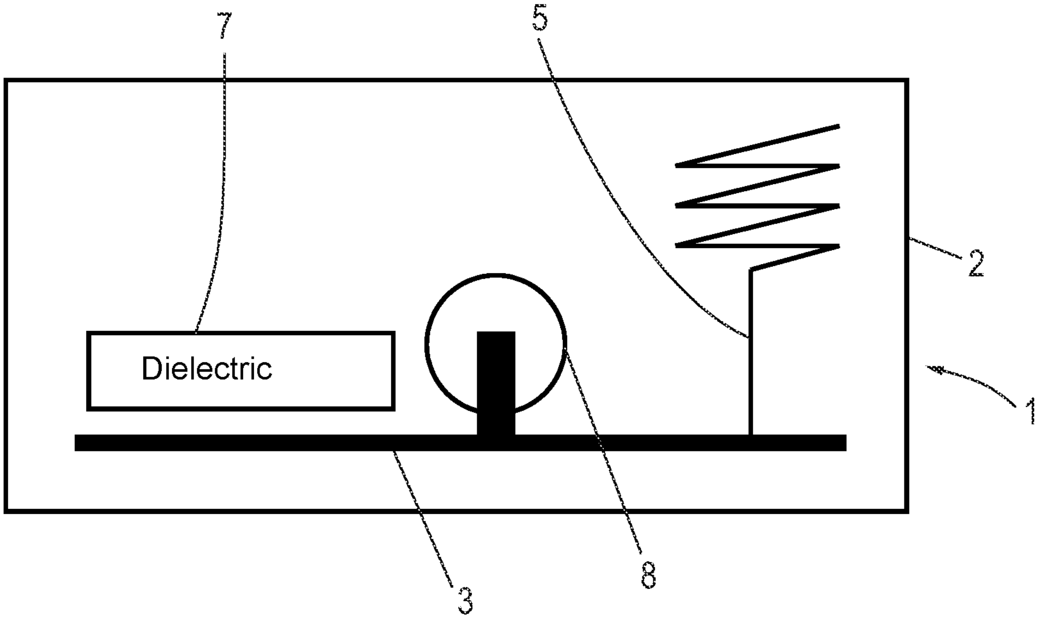

In the exemplary embodiment shown in FIG. 4, the dielectric 7 and the antenna 5 are disposed, similarly to FIG. 1, on the same side of the circuit board 3. An influence of the dielectric 7 on the properties of the antenna 5 is reduced in this example in particular by placing a shielding device 8 between those components, the shielding device being formed in the example by an electrical component of the apparatus 1, namely by an energy store, in the concrete example by a cylindrical battery. As can clearly be seen in this example, components which are already used in the apparatus 1 can additionally be used, by being suitably disposed, to eliminate or at least reduce the influence of the changeable permittivity of the dielectric 7 on the properties of the antenna 5.

Figure 5:
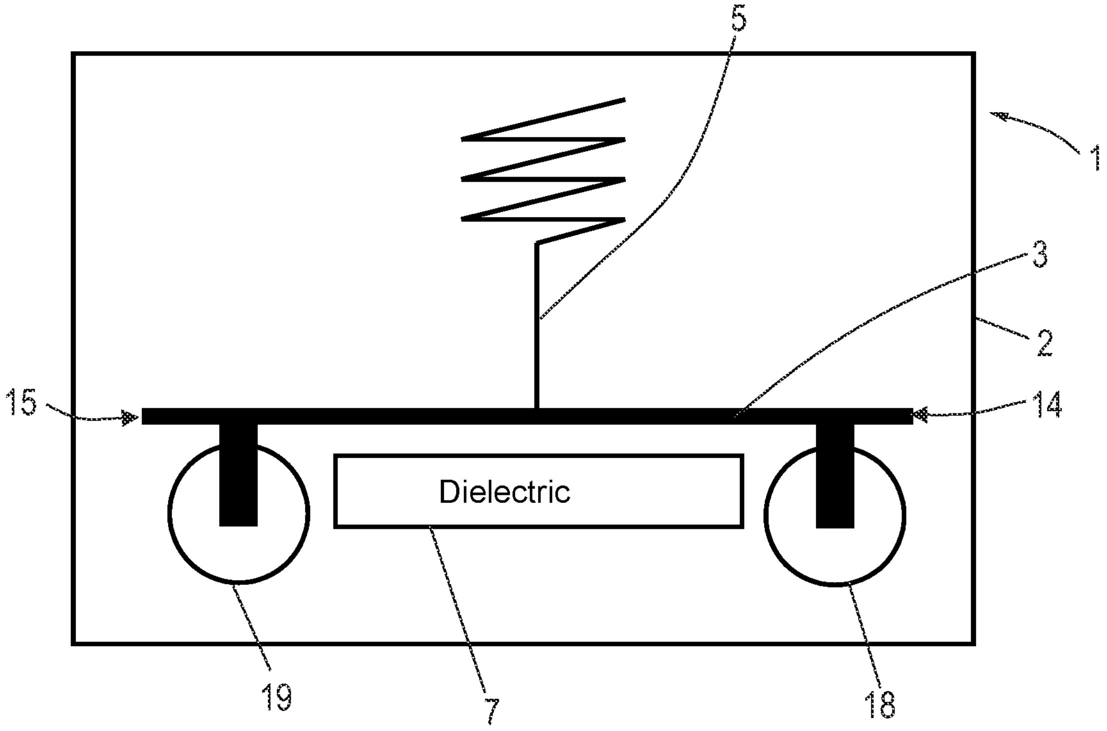

In the apparatus shown in FIG. 5 too, energy stores are used to achieve shielding of the dielectric 7 in respect of the fields radiated by the antenna 5. In this case, however, the dielectric 7 is disposed, as in FIG. 2, on the rear side of the circuit board 3. As has already been explained, it can, however, be relevant here to decouple the dielectric 7 sufficiently from the fields that occur at the edges 14, 15 of the circuit board 3. While this has been achieved in the example shown in FIG. 2 solely by using sufficient distances 12, 13 of the dielectric 7 from the edges 14, 15, metallic or metal-containing components 18, 19, in the example batteries, between the respective edge 14, 15 and the dielectric 7 are additionally used in FIG. 5 in order to shield the dielectric 7 from fields occurring at the edges 14, 15.

Figure 6:
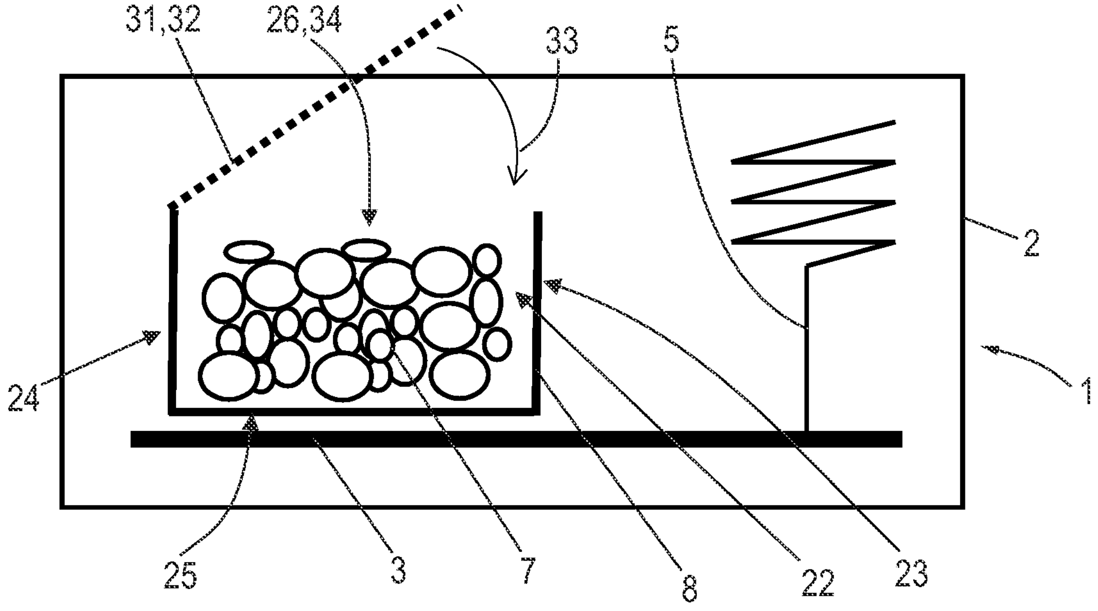
Figure 7:
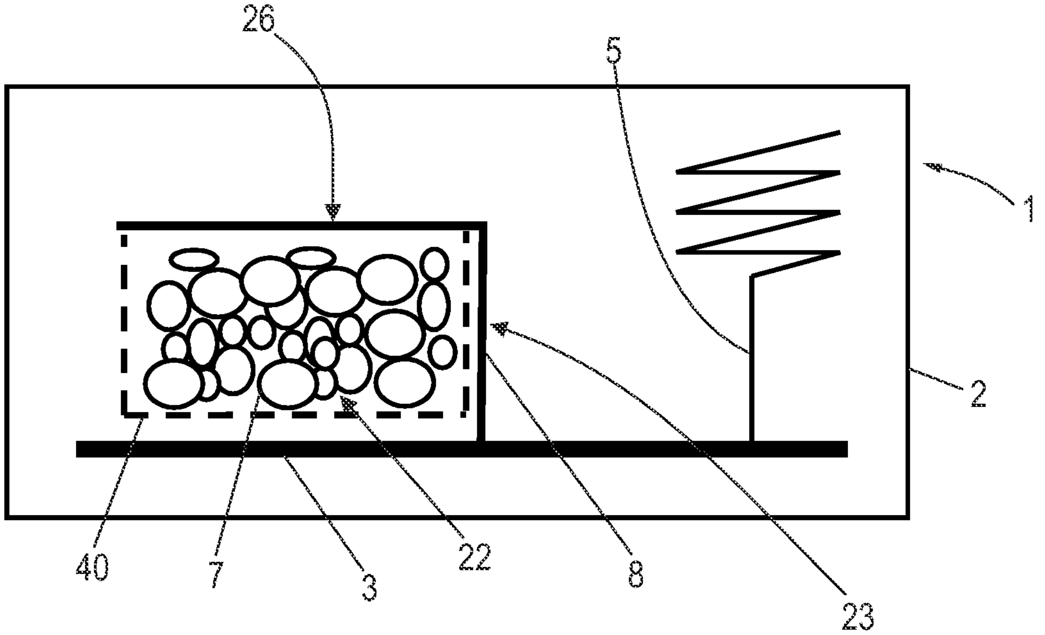
Figure 8:
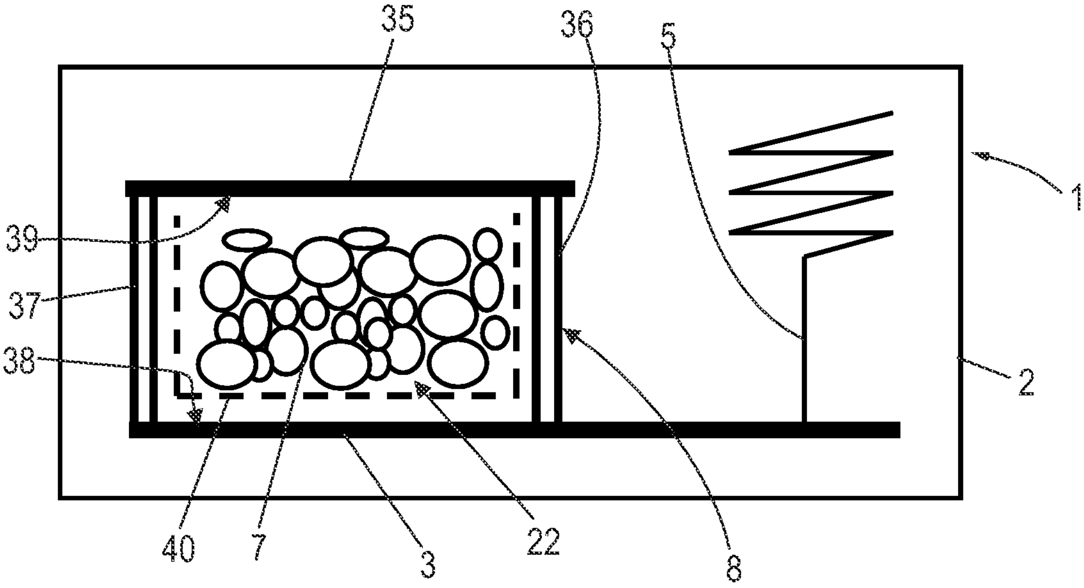

FIGS. 6 to 8 each show apparatuses 1 in which the dielectric 7 being used is held in a holding volume 22 which is enclosed at least in part by the shielding device 8. The holding volume 22 is thus delimited by the shielding device 8 at least at some of its side faces 23-26. The shielding device 8 in this case can be formed in different ways, as has already been explained with reference to FIG. 3.

In the apparatus 1 shown in FIG. 6, the shielding device 8 has a box-shaped form and thus delimits the holding volume 22 at the three side faces 23, 24, 25 shown and at side faces (not shown) which lie in front of or behind the image plane. The side face 26 that remains free forms an opening 34 through which the dielectric 7 can be introduced into or removed from the holding volume 22 when the closing device 31 is in the open position 32 shown. By pivoting the closing device 31, as is illustrated by an arrow 33, the dielectric 7 can be enclosed completely, as a result of which an influence on the properties of the antenna 5 can be suppressed particularly well.

In the apparatus 1 according to FIG. 7, a comparatively more simply constructed L-shaped shielding device 8 is used, the shielding device delimiting the side faces 23 and 26 of the holding volume 22 and suppressing the passage of fields through these side faces 23, 26 substantially completely. In addition, delimitation or shielding takes place via the circuit board 3 itself at the side face 25. This three-sided enclosure by shielding components may already be sufficient to achieve adequate shielding of the antenna 5 with respect to the changeable properties of the dielectric 7.

Since in the example shown, the dielectric 7 is in the form of granules, a holding device 40, for example a basket, is additionally used. A change of the dielectric 7, that is to say in the example of the drying agent, can in this case be carried out, for example, by removing the basket, following which the drying agent in the basket is replaced and the basket with the fresh drying agent is inserted into the holding volume 22 again. In principle, the holding device 40 could serve as an additional shielding, but it may also be sufficient to use an insulating holding device 40, for example of plastics material, since shielding is already provided by the shielding device 8 and the circuit board 3.

The apparatus 1 shown in FIG. 8 corresponds substantially to the apparatus 1 discussed with reference to FIG. 7, apart from the configuration of the shielding device 8. The shielding device 8 is formed in FIG. 8 in that a further circuit board 35 is connected to the circuit board 3 via connecting devices 36, 37, which in particular form plug-in contacts, provided on the further circuit board. In this case, shielding of the dielectric 7 is effected by the conductive surfaces 38, 39 of the circuit boards 3, 35 and the conductive connecting devices 36, 37.

The following is a summary list of reference numerals and the corresponding structure used in the above description of the invention:

1 Apparatus
2 Housing
3 Circuit board
4 Communication device
5 Antenna
6 External device
7 Dielectric
8 Shielding device
9 Distance
10 Diameter
11 Interior
12 Distance
13 Distance
14 Edge
15 Edge
16 Circle
17 Circle
18 Component
19 Component
20 Component
21 Component
22 Holding volume
23 Side face
24 Side face
25 Side face
26 Side face
27 Recess
28 Base
29 Rim
30 Closed position
31 Closing device
32 Open position
33 Arrow
34 Opening
35 Circuit board
36 Connecting device
37 Connecting device
38 Surface
39 Surface
40 Holding device

The invention claimed is:

1. An apparatus or measuring device for acquiring a consumption quantity, the apparatus comprising:

a housing having an interior with a maximum diameter;
a circuit board disposed inside said housing;
an antenna disposed at or on said circuit board;
a communication device adapted to transmit data at a given carrier frequency between the apparatus and an external device via said antenna;

a dielectric disposed inside said housing, said dielectric having a permittivity influencing a range or efficiency of said antenna relative to the given carrier frequency; and at least one of:

said circuit board or a metallic or metal-containing shielding device being disposed between said dielectric and said antenna, or a minimum distance being provided from said antenna to said dielectric, said minimum distance being at least 30% of said maximum diameter.

2. The apparatus according to claim 1, wherein said minimum distance is at least 50% of said maximum diameter.

3. The apparatus according to claim 1, wherein said dielectric is a drying agent.

4. The apparatus according to claim 1, wherein said permittivity of said dielectric relative to the carrier frequency changes by at least 50% over a given operating time period of the apparatus.

5. The apparatus according to claim 4, wherein said permittivity of said dielectric relative to the carrier frequency changes at least one of:

as a result of ageing of said dielectric, or until said dielectric becomes saturated with water.

6. The apparatus according to claim 5, wherein said dielectric becomes saturated with water as a result of at least one of adsorption or chemical binding of water.

7. The apparatus according to claim 1, wherein said dielectric is disposed at a distance of at least 2 mm from edges of said circuit board.

8. The apparatus according to claim 1, wherein said dielectric is disposed at a distance of at least 10 mm from edges of said circuit board.

9. The apparatus according to claim 1, wherein:

said circuit board has mutually opposite first and second edges;

said antenna is disposed on said circuit board between said first edge and said second edge;

said antenna is disposed closer to said first edge than to said second edge; and said dielectric is disposed closer to said second edge than to said first edge.

10. The apparatus according to claim 1, which further comprises a metallic or metal-containing component disposed between said dielectric and at least one edge of said circuit board.

11. The apparatus according to claim 10, wherein at least one of said shielding device or said metallic or metal-containing component is an electrical component of the apparatus.

12. The apparatus according to claim 10, wherein at least one of said shielding device or said metallic or metal-containing component is an energy store for providing energy for at least one of said communication device or at least one component for acquiring measurement data.

13. The apparatus according to claim 1, wherein at least one of said shielding device or said metallic or metal-containing component is or includes at least one of a wire mesh, or a metal sheet, or metallic threads, or particles in a matrix material, or a metal-coated carrier material.

14. The apparatus according to claim 13, wherein said metal sheet is perforated.

15. The apparatus according to claim 1, which further comprises:

a cuboidal holding volume receiving said dielectric; and at least one of said shielding device, or said circuit board, or said metallic or metal-containing component delimiting said cuboidal holding volume on at least two or at least three or at least four or at least five or six side faces of said cuboidal holding volume.

16. The apparatus according to claim 15, which further comprises:

a cuboidal holding volume receiving said dielectric;

at least one of said shielding device, or said circuit board, or said metallic or metal-containing component delimiting said cuboidal holding volume on at least two or at least three or at least four or at least five or six side faces of said cuboidal holding volume;

a closing device having a closed position closing said recess or a further side face of said holding volume;

said closing device being movable or pivotable relative to said recess or said holding volume from said closed position into an open position for freeing an opening of said recess or of said holding volume; and said dielectric configured to be at least one of introduced into or removed from said recess or said holding volume through said opening.

17. The apparatus according to claim 1, wherein:

said housing has an inner surface;

said housing includes a recess having a base formed by said inner surface and a rim formed by said inner surface;

said base is spaced further apart from said circuit board than said a rim; and said dielectric is held in said recess.

18. The apparatus according to claim 1, which further comprises:

a further circuit board;

said dielectric being disposed between said circuit board and said further circuit board and said dielectric having sides;

said circuit board and said further circuit board each having a respective conducting surface; and a connecting device being disposed on at least one of said sides of said dielectric and connected to said conducting surfaces of said circuit board and said further circuit board.

* * * * *